United States Patent [19]

Lloyd et al.

[11] Patent Number: 4,780,112
[45] Date of Patent: Oct. 25, 1988

[54] METHOD FOR THE CONTINUOUS CHEMICAL REDUCTION AND REMOVAL OF MINERAL MATTER CONTAINED IN CARBON STRUCTURES

[75] Inventors: Robert Lloyd; Maxwell J. Turner, both of New South Wales, Australia

[73] Assignee: Oabrand PTY. Limited, New South Wales, Australia

[21] Appl. No.: 931,449

[22] PCT Filed: Feb. 18, 1986

[86] PCT No.: PCT/AU86/00044
§ 371 Date: Dec. 10, 1986
§ 102(e) Date: Dec. 10, 1986

[87] PCT Pub. No.: WO86/04917
PCT Pub. Date: Aug. 28, 1986

[30] Foreign Application Priority Data

Feb. 19, 1985 [AU] Australia .............................. PG9350

[51] Int. Cl.$^4$ .............................................. C10L 9/02
[52] U.S. Cl. ........................................ 44/621; 44/627; 423/460; 423/461
[58] Field of Search ................ 423/460, 461; 502/416, 502/413; 44/620, 621, 627

[56] References Cited

U.S. PATENT DOCUMENTS

| 1,537,286 | 5/1925 | Barnebey | 502/413 |
| 1,904,833 | 4/1933 | Marek | 44/627 |
| 2,837,412 | 6/1958 | Bennett | 423/460 |
| 3,998,604 | 12/1976 | Hinkley | 44/627 |
| 4,083,940 | 4/1978 | Das | 44/621 |
| 4,169,710 | 10/1979 | Jensen | 44/621 |
| 4,239,613 | 12/1980 | Schulz | 44/627 |
| 4,424,062 | 1/1984 | Kamino et al. | 44/627 |
| 4,516,980 | 5/1985 | Wheelock | 44/627 |
| 4,695,290 | 9/1987 | Kindig et al. | 423/460 |

FOREIGN PATENT DOCUMENTS

| 0112673 | 7/1982 | Japan | 423/460 |
| 0170812 | 10/1982 | Japan | 423/461 |
| 3535922 | 4/1986 | Netherlands | 423/461 |

Primary Examiner—John Doll
Assistant Examiner—Wayne A. Langel
Attorney, Agent, or Firm—Ladas & Parry

[57] ABSTRACT

A process for treating carbon to reduce the ash content therein. The process involves treating the carbon with a fluorine acid solution which consists of an aqueous solution of hydrofluorosilicic acid and hydrogen fluoride, such that the available metal oxides are converted to metal fluorides and/or metal fluorosilicates and separating the treated carbon from the metal fluorides and/or metal fluorosilicates produced by the treatment.

17 Claims, 1 Drawing Sheet

METHOD FOR THE CONTINUOUS CHEMICAL REDUCTION AND REMOVAL OF MINERAL MATTER CONTAINED IN CARBON STRUCTURES

This invention relates to a process for treating carbon to reduce the ash content therein. In the specification and claims the term "carbon" includes "coal, coke, graphite and other carbon structures".

BACKGROUND ART

The commercial use of untreated carbon as fuel results in excessive pollution and maintenance difficulties in industrial plants due to presence of contaminants in the carbon. Also when a carbon structure, such as graphite, is used for anodes or cathodes in electric industrial applications or where graphite is used for lubricants, contaminates can cause pollution, poor conductivity and wear mechanical parts. The de-contamination of carbon has been a major problem which has resulted in the range of uses of coal as a basic fuel being severely restricted because of environmental requirements. In addition, installation costs of industrial plants which use raw coal for fuel are high because of the need for pollution control equipment to scrub exhaust gases. There are also high maintenance costs associated with cleaning of such plants as contaminates form coatings on surfaces exposed to coal combustion and exhaust gases. For a carbon structure of graphite, contaminates therein reduces its economic value as well as resulting in environmental pollution in electric industrial applications. Where graphite is used as a lubricant contaminates therein also reduce its economic value and effectiveness as a lubricant.

It has been found that contaminants in carbon can at least in part be removed by using hydrofluoric acid. The problem encountered in using hydrofluoric acid by itself to react with siliceous and other inorganic contaminants in carbon is that hydrofluoric acid is not selective and will react with almost all of the contaminates. The disadvantage of this non-selectivity is that Ca and Mg contaminates are converted to insoluble $CaF_2$ and $MgF_2$ which cannot be easily removed. The rate and extent of reaction is directly related to the temperature and strength of the acid.

The amount of HF necessary to totally react with metal oxides in the carbon is relatively small in comparison to the volume of carbon, so that this volume of acid alone would be insufficient to thoroughly wet the carbon. If a sufficient volume of $H_2O$ is mixed with this acid to wet the carbon, the acidity level is lowered and this affects the reaction time, the degree of purification of the carbon, the ability of the acid solution to solubilize and carry the metal fluorides from the carbon and also creates a large waste liquid treatment requirement.

Once the carbon is wet with acid, it leaves the leach circuit as a slurry and goes to a physical solids-liquids separation process which is typically mechanically arranged through a centrifuge or vacuum filter. After the solids-liquids separation step, the carbon retains on its surface about 15% by weight of leach liquor. The 15% by weight is of the weight of the carbon structure plus the retained leach liquor. Since acid in the retained leach liquor can be lost to the process, it is necessary to ensure that the leach liquor used contains the least expensive HF component by weight in order to ensure that the process is economically feasible.

The metal oxides within the carbon are converted into fluorides and in most cases are taken into a solution. However, some metal fluorides are not soluble in hydrofluoric acid such as calcium fluoride. This creates a major problem in that being insoluble, they tend to block the pores of carbon and thereby restrict the time and the extent of the chemical reactions on other metal oxides which may be locked behind them in the carbon.

As the residual liquor remaining in the carbon after leaching is typically around 15%, much of the solution will be fluorine, attached to silica or alumina. The economic recovery of fluorides from these metals is costly.

The problem in reacting hydrofluoric acid with metal oxides is the high cost of fluorine as the chemical reaction: $Al_2O_3 + 6HF \rightarrow 2AlF_3 + 3H_2O$ consumes a substantial amount of hydrofluoric acid relative to the aluminium oxide.

As a further example of this, the main loss occurs in the reaction:

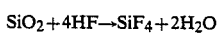

$$SiO_2 + 4HF \rightarrow SiF_4 + 2H_2O$$

However, in the presence of aqueous solutions, the $SiF_4$ will hydrolyze into $H_2SiF_6$ and so give off $SiO_2$ which will react with further amounts of HF so we now have a further loss of fluorides to the solution and therefore a higher cost in raw materials.

DISCLOSURE OF INVENTION

It is an object of this invention to provide a process for the removal of ash from carbon which ameliorates the above problems.

This invention concerns a process for the removal of ash from carbon by the use and manipulation of fluorine containing acids in such mixtures and concentrations and with variation of temperatures to reduce the amount of total liquids and quantities of acids used in the reactions and simultaneously control the levels of acidity, the reaction times and selectivity with regards to the elements being attacked and reacted with the acids. In addition, it is possible using the process of the invention to control the specific gravity of the solutions in order to effect more effective transport of the carbon materials in the solution and maintain the reaction throughout the leaching system. Most of the contaminates in carbon are metal oxides and most of these can be dissolved into the fluorine acid solution of the invention. This has the effect of increasing the specific gravity of the solution which in turn assists in the transportation of the carbon materials through the leaching system as the carbon becomes lighter by the removal of the contaminate components, the metal oxides react with the acid mixture, and the acid mixture provides a transportation medium for the reacted metal oxides as dissolved metal fluoride silicates.

The invention also addresses the problems of reaction time and completeness of reaction and to do this, control of both temperature and pressure and acid concentration is done within specific limits which are governed by the specific azeotrope of the acid related to the pressure.

In a first embodiment this invention provides a process for treating carbon, as herein defined, to substantially reduce the ash content thereof comprising treating the carbon with a fluorine acid solution which includes an aqueous solution of hydrofluorosilicic acid and HF, such that the available metal oxides are converted to metal fluorides and/or metal fluorosilicates and separating the treated carbon from the metal fluorides and/or metal fluorosilicates produced by the treatment. Optionally the acid solution is prepared by adding anhydrous hydrogen fluoride gas to a saturated aqueous solution of hydrofluorosilicic acid. It is preferred that the pressure is maintained at 14-19 psia whilst the carbon is being treated.

A fluorine acid solution of this invention can be prepared from a solution of fluorosilicic acid ($H_2SiF_6 + H_2O$) as the base acid to which anhydrous hydro-fluoric acid (HF) is added so that both these reactive acids are in the one solution. Although both these acids are in the one solution, they act independently in the process of the invention due to the fact that the two reactive fluorides do not chemically combine.

Typical compositions of fluorine acid solutions of this invention lie between the following compositions: 5% W/W $H_2SiF_6$, 90% W/W $H_2O$ and 5% W/W HF and 34% W/W $H_2SiF_6$, 32% W/W $H_2O$ and 34% W/W HF. A fluorine acid solution of: 25% W/W $H_2SiF_6$, 50% W/W $H_2O$ and 25% W/W HF is particularly preferred. Conveniently a fluorine acid solution is prepared from a saturated solution of $H_2SiF_6$ in water to which gaseous anhydrous HF is added.

Preferably, the carbon is reduced to approximately 2 mm minus prior to reaction with the fluorine acid solution.

Conveniently the treated carbon is further treated with acid solution in at least one tubular reactor to ensure continuous contact between the fluorine acid solution and the carbon to be reacted. It is preferred that the mixture is ultrasonically agitated as it is passing through the tubular reactor. Preferably the pressure in the reactor is applied and/or maintained at 50-70 psia and the temperature is maintained at 70° C.

Preferably the carbon is used as a filter medium in the solids-liquids separation stage to retain metal fluorides and/or metal fluorosilicates which are free in the leach liquor on the surface of the treated carbon.

It is preferred that leach liquor retained on the surface of the treated carbon is used as a purifying leach stream for leach liquors.

Conveniently, the treated carbon is washed with aqueous fluorosilicic acid ($H_2SiF_6$) to remove metal fluorides and/or metal fluorosilicates from the surface thereof.

Preferably the treated carbon after washing with $H_2SiF_6$ is heated initially to 70° C.-140° C. preferably 130° C. and then to between 250° C. and 400° C. preferably 300° C. to remove fluorosilicic acid on the surface which comes off as HF and $SiF_4$. Optionally, the HF and $SiF_4$ gases are scrubbed by conventional water wash means for recovery of HF and conversion of $SiF_4$ with $H_2O$ to $SiO_2$ and HF.

Preferably the $SiF_4$ produced is treated with further water to form $H_2SiF_6$.

In a preferred form of the invention $SiF_4$ gas released from the process is added to water in a spray tower to produce $H_2SiF_6$, $H_2O$ and $SiO_2$. The $SiO_2$ is preferably removed from the spray tower and crystallized.

The $H_2SiF_6$ and $H_2O$ which leave the tower are conveniently heated to liberate $SiF_4$ from the $H_2SiF_6$ which leaves insufficient silica to combine with HF available so that 2HF is produced. Optionally the $H_2SiF_6$ is recirculated and concentrated before exiting from the spray tower and the HF produced is recycled to make further fluorine acid solution and the $H_2SiF_6$ is recycled to make further acid solution.

BRIEF DESCRIPTION OF DRAWING

A preferred embodiment of this invention will now be described by way of example with reference to the drawing in which.

BEST MODE OF CARRYING OUT INVENTION

Figure 1:
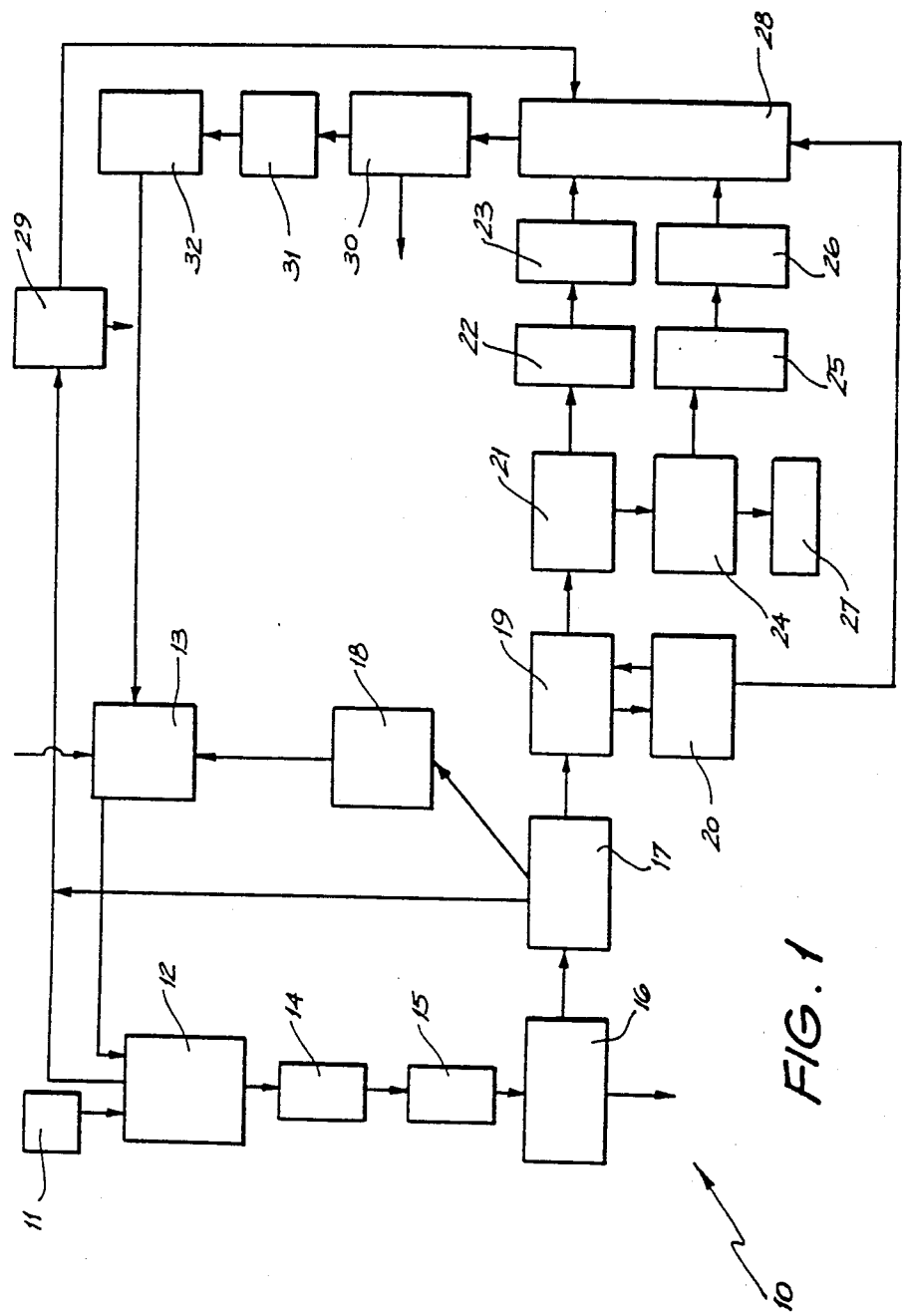
FIG. 1 is a block diagram of a system for treating carbon to reduce the ash content therein.

Referring to FIG. 1 a block diagram of a system 10 for treating carbon to reduce the ash content therein which utilises the process of the invention includes a hopper 11 from which untreated coal which has been reduced to about 2 mm minus by conventional reduction and screen selection methods is fed to an initial mixing vessel 12. Simultaneously a fluorine acid solution is fed into vessel 12 from acid storage vessel 13. The coal/acid solution is stirred in vessel 12 by a conventional stirrer for 10 to 20 minutes, typically 15 minutes. During the stirring silicon dioxide contaminant in the coal reacts with the acid solution to form silicon tetrafluoride gas which is directed to purification still 28 via scrubbing tower 29. The pressure in vessel 12 is maintained at 14-19 psia during stirring.

The coal/acid solution mixture is then fed through tubular reactor 14. The mixture is simultaneously ultrasonically agitated as it is passing through reactor 14. Typically the temperature in reactor 14 is maintained at about 70° C. and a pressure of from 50 to 70 psia is applied and/or maintained. The mixture then passes to a second tubular reactor 15 through which it passes without ultrasonic agitation to a separator 16. As a result of the reactions in vessel 12 and reactors 14 and 15 the treated coal has a lower specific gravity than the untreated coal and the reacted acid solution and floats to the top of the mixture. Unreacted iron sulfide and other heavy unreacted undissolved metal salts whose specific gravities are heavier than the acid solution fall to the bottom of separator 16 where they can be readily removed. Typically the initial specific gravity of coal is 1.6 and that of the acid solution is 1.3 on entering vessel 12 and the specific gravity of treated coal and acid entering separator 16 are 1.2 and 1.6 respectively. The mixture is then fed to a solids-liquids separation section which consists of a belt filter or centrifuge 17. During the separation process the treated carbon acts so as to filter metal fluorides and/or metal fluorosilicates which are contained in the acid solution. Silicon tetrafluoride is vented from centrifuge 17 to still 28 via scrubbinng tower 29. The filtered acid solution from centrifuge 17 is fed to tank 18 where its composition is readjusted for recycling to mixing vessel 12 via storage vessel 13. The filtered treated coal is then transferred to washer 19 where it is washed with an aqueous 32% weight for weight solution of $H_2SiF_6$. During the wash the treated coal and $H_2SiF_6$ are physically and ultrasonically agitated and the $H_2SiF_6$ is recirculated between washer 19 and acid purifier tank 20 in which the acid is electrochemically purified by depositing metal ions dissolved in the acid on a cathode. During this washing procedure metal ions on the carbon surface react with $H_2SiF_6$ and these are readily removed in a later step. For example, any $CaF_2$ and $MgF_2$ are converted to $CaSiF_6$ and $MgSiF_6$ respectively which can be readily removed. By using $H_2SiF_6$ and not water to wash the impurities from the surface of the treated coal metal ions residing on the surface are not hydrolyzed to metal oxides and hydroxides which may not be soluble in an aqueous solution.

After washing the treated coal is transferred to drying system 21 where it is dried at about 130° C. under an inert atmosphere. Gases such as hydrogen fluoride and silicon tetrafluoride which are liberated during drying are fed to still 28 via scrubbing towers 22 and 23. Dried coal from drier 21 is transferred to baking oven 24 where it is baked under inert atmosphere at between 250° C. to 400° C. to effect removal of the remaining hydrofluorosilicic acid from the coal surface which is liberated as hydrogenfluoride and silicon tetrafluorine gas and directed to still 28 via scrubbing towers 25 and 26. The dried treated coal is transferred from baking oven 24 to storage bin 27 and is considered as a finished porduct. Spent $H_2SiF_6$ from purifier 20 is fed to still 28 and hydrogen fluoride and silicon tetrafluoride gases from drier 21 and baking over 24 via scrubbers 22, 23 and 25, 26 are delivered to still 28 as aqueous solutions of hydrogen fluoride/hydro fluorosilicic acid mixture. This mixture is boiled at sufficient temperatures to liberate hydrogen fluoride and silicon tetrafluoride from the aqueous solution and metal fluorides that are solubilized in solution are crystallized and removed for further processing. Hydrogen fluoride and silicon tetrafluoride from vessel 12 are fed to still 28 via scrubbing tower 29 in the form of an aqueous hydrogen fluoride/hydrofluorosilicic acid mixture. Since the gases from vessel 12 tend to relatively pure high purity silicon dioxide is recovered as a saleable product from tower 29.

The hydrogen fluoride and silicon tetrafluoride gases and water vapour from still 28 are cooled, compressed and water is added to condensor/precipitator 30 to yield hydrofluorosilicic acid, water and silicon dioxide. The crystallized silicon dioxide is crystallized, filtered and removed from condensor/precipitator 30 and the hydrofluorosilicic aqueous solution is transferred to still 31 where silicon tetrafluoride and hydrogen fluorine are liberated by applying sufficient heat to the solution. Initially silicon tetrafluoride is liberated leaving insufficient silicon to combine with fluorine so that hydrogen fluoride is produced. The hydrogen fluoride is removed from the silicon tetrafluoride and returned to vessel 13, the silicon tetrafluoride is further treated with water in condensor/precipitator 32 to form hydrofluorosilicic acid, and the procedure described for condensor/precipitator 30 is repeated.

The extent of the hydrofluorosilicic acid reduction to two molecules of hydrogen fluoride and silicon tetrafluoride and the subsequent separation and return of the hydrogen fluoride to vessel 13 is dependent on the ash content of the coal so that as coal with a higher ash content is used additional hydrogen fluoride from an external source has to be added to vessel 13 to affect the desired concentration.

The practice of invention is now described by way of examples:

EXAMPLE 1

Step 1: 1 kg of bituminous coal of general world average standard having:
10% Ash (70% $SiO_2$, 25% $Al_2O_3$ and 5% others)
30% Volatile
2.5% Moisture
0.6% Sulfur (0.3% as FeS)
This sample was reduced to 2 mm minus by crushing and screening.

Step 2: An acid solution of weight 3 kgs was prepared, consisting of 25.56% $H_2SiF_6$, 49.62% $H_2O$ to which was added 24.82% of anhydrous HF.

Step 3: The acid solution was heated in a sealed vessel of mild steel lined with natural rubber. The vessel was also fitted with a continuous stirrer.

Step 4: To this solution was added through a pressure trap, the 1 kg of 2 mm minus coal from Step 1.

Step 5: The coal acid solution mixture was stirred and the pressure in the vessel was controlled at 17 psia by allowing the $SiF_4$ gas generated to bleed off at a controlled rate.

Step 6: The $SiF_4$ gas was bled into a plastic vessel and bubbled and agitated through $H_2O$. This formed $H_2SiF_6$ in $H_2O$ together with $33\frac{1}{3}\%$ W/W of crystallized $SiO_2$ which was removed by filtering the solution.

Step 7: The mixture of coal and acid was then pumped into a plastic tube reactor. This tube was installed inside of a water filled steel tank, via the steel tank the water was subject to ultrasonic agitation. The acid and coal solution remained in this tube reactor for 5 minutes.

Step 8: The mixture of coal and acid was then pumped through the second tube reactor in 10 minutes.

Step 9: On leaving the reactor, the excess solution down to 15% moisture was removed from the coal via a pressure filter.

Step 10: The coal with 15% acid on the surface was agitated in a plastic vessel with 6 kg of $H_2SiF_6$ passing through the coal as bed.

Step 11: The coal was then removed and the excess $H_2SiF_6$ down to 15% was removed and stored for latter use.

Step 12: The coal was then placed in a vented drying vessel and heated to 130° C. The vented gases from the drying process were taken to a central scrubber where the liberated $SiF_4$ and HF were recovered.

Step 13: The coal in the drying vessel was subjected to a passage of inert gas at 400° C. through the coal for 5 minutes.

Step 14: The gas from this baking process also went to the gas scrubber where the $SiF_4$ and HF were reclaimed.

Step 15: The coal was then cooled and analysed and was found to contain only 1000 ppm of residue ash which was almost entirely $TiO_2$ with traces of $SiO_2$, $Al_2O_3$ and $Fe_2O_3$ NOTE: It was found that the bottom of the vessel used as a pressure filter to separate a liquid from a coal on leaving the tube reactor was covered with minute particles of FeS. The FeS was collected and analysed and represents almost total FeS in the coal.

EXAMPLE 2

Step 1: A coal chosen for testing contained 35% ash (88% $SiO_2$, 5% $Al_2O_3$, 7% others) 20% volatile 11% moisture before drying and 1.5% sulfur. This coal was dried to 5% moisture and reduced to 2 mm minus by crushing and screening.

Step 2: The acid solution used in Example 1 was collected and contained 15.96% $H_2SiF_6$, 39.02% $H_2O$, 6% of other metal flourosilicates. To this was added 39.02% of anhydrous HF gas.

Step 3: This solution was placed in a rubber lined vessel heated to 70° C. and stirred. To the solution was added 1 kg of coal.

Step 4: The solution reacted violently generating a large amount of $SiF_4$ which was rapidly bled off and hydrolyzed in water.

Step 5: The mixture of coal and acid was pumped through a first tube reactor and subject to ultrasonic agitation.

Step 6: The coal and solution passed through a second tube reactor and then the excess acid was removed down to 15%. This became difficult as the surface of the carbon had become more activated.

Step 7: The coal sample was dried and baked, drying at 132° C. and baked to 330° C.

Step 8: The coal was cooled and analysized and found to contain 1130 ppm of ash, no FeS and it was observed the particles were particularly porous.

NOTE: It was observed that the old recycled acid with addition of HF anhydrous performed as well as new acid and that the high ash coal processed equally as well as low ash coal in time and quality. However, the regeneration of $SiF_4$ to HF would add to the projected cost making the process for this coal 5-10% more expensive.

We claim:

1. A process for treating carbon, as herein defined, to reduce the ash content therein comprising treating the carbon with a fluorine acid solution which comprises an aqueous solution of hydrofluorosilicic acid and hydrogen fluoride, such that the available metal oxides are converted to soluble metal fluorides and/or metal fluorosilicates which dissolve in said aqueous solution and separating the treated carbon from the aqueous solution containing the dissolved metal fluorides and/or metal fluorosilicates and wherein the treated carbon is washed with fluorosilicic acid ($H_2SiF_4$) to remove metal fluorides and/or metal fluorosilicates from the surface thereof, drying the washed treated carbon at a temperature of from 70° to 140° C. and heating the treated carbon to a temperature of between 250° to 400° C. to remove fluorosilicic acid in the form of HF or $SiF_4$.

2. The process of claim 1 wherein the acid solution is prepared by adding anhydrous hydrogen fluoride gas to a saturated aqueous solution of hydrofluorosilicic acid.

3. The process of claim 1 wherein the carbon is treated with acid solution under a pressure of 14-19 psia.

4. The process of claim 1 where the carbon is reduced to approximately 2 mm minus prior to reaction with the acid solution.

5. The process of claim 1 wherein the treated carbon is further treated with the acid solution in at least one tubular reactor to ensure continuous contact between the acid solution and the treated carbon.

6. The process of claim 5 wherein the tubular reactor is ultrasonically agitated whilst the treated carbon is further treated.

7. The process of claim 5 wherein whilst the treated carbon 1 further treated it is at a temperature of 65° C.-75° C. under a pressure between 50-70 psia.

8. The process of claim 1 where the treated carbon or further treated carbon is used as a filter medium in a solids-liquids separation stage to retain metal fluorides and/or metal fluorosilicates which are free in the leach liquor on the surface of the treated carbon.

9. The process of claim 1 wherein the carbon is coal.

10. The process of claim 9 in which the HF and $SiF_4$ gases are scrubbed by conventional water wash means for recovery of HF and conversion of $SiF_4$ with $H_2O$ to SiO, and HF.

11. The process of claim 1 in which $SiF_4$ gas released from the process is added to water to produce $H_2SiF_6$, $H_2O$ and $SiO_2$.

12. The process of claim 11 in which the $SiO_2$ is precipitated and/or crystallized from water.

13. The process of claim 11 in which $H_2SiF_6$ and $H_2O$ from the tower are heated to liberate $SiF_4$ from the $H_2SiF_6$ which leaves insufficient silicon to combine with HF available so that 2HF is produced.

14. The process of claim 11 in which the $H_2SiF_6$ is concentrated.

15. The process of claim 10 in which HF produced is recycled to make the acid solution.

16. The process of claim 10 in which the $SiF_4$ produced is treated with further water to form $H_2SiF_6$.

17. The process of claim 11 in which $H_2SiF_6$ produced is recycled to make the acid solution.

* * * * *